(12) United States Patent
Banin et al.

(10) Patent No.: US 10,009,725 B2
(45) Date of Patent: Jun. 26, 2018

(54) ACCESS POINT POSITION DETERMINATION BY MOBILE DEVICES CROWD SOURCING

(71) Applicant: Intel IP Corporation, Santa Clara, CA (US)

(72) Inventors: Leor Banin, Petach Tikva (IL); Yuval Amizur, Kfar-Saba (IL); Uri Schatzberg, Kiryat ono (IL); Chagai Fridman, Modiin (IL)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/113,481

(22) PCT Filed: Mar. 3, 2014

(86) PCT No.: PCT/US2014/019842
§ 371 (c)(1),
(2) Date: Jul. 22, 2016

(87) PCT Pub. No.: WO2015/133983
PCT Pub. Date: Sep. 11, 2015

(65) Prior Publication Data
US 2017/0034657 A1    Feb. 2, 2017

(51) Int. Cl.
*H04W 4/02* (2018.01)
*G01S 11/00* (2006.01)
(Continued)

(52) U.S. Cl.
CPC ........... *H04W 4/023* (2013.01); *G01S 5/0242* (2013.01); *G01S 5/0278* (2013.01); *G01S 11/00* (2013.01);
(Continued)

(58) Field of Classification Search
CPC ... H04W 4/023; H04W 64/003; H04W 88/02; G01S 5/0278; G01S 11/026; G01S 5/0242
(Continued)

(56) References Cited

U.S. PATENT DOCUMENTS 9,071,935 B2 *  6/2015  Venkatraman ........ G01S 5/0236
9,432,964 B2 *  8/2016  Garin .................. H04W 64/003
(Continued)

FOREIGN PATENT DOCUMENTS

WO    WO-2015133983 A1    9/2015

OTHER PUBLICATIONS

"International Application Serial No. PCT/US2014/019842, International Search Report dated Nov. 26, 2014", 3 pgs.
(Continued)

*Primary Examiner* — Cong Tran
(74) *Attorney, Agent, or Firm* — Schwegman Lundberg & Woessner, P.A.

(57) ABSTRACT

Embodiments for performing access point position determination using crowd sourcing are generally described herein. In some embodiments, a range report request is received, by at least one mobile device, from a network entity for determining a position of a plurality of access points (APs). The at least one mobile device performs range measurements on each of the plurality of APs at different locations. A range report associated with the range measurements performed on each of the plurality of APs is sent to the network entity by the at least one mobile device.

25 Claims, 5 Drawing Sheets

(51) Int. Cl.
 G01S 11/02 (2010.01)
 G01S 5/02 (2010.01)
 H04W 64/00 (2009.01)
 *H04W 88/02* (2009.01)
 *H04W 88/08* (2009.01)

(52) U.S. Cl.
 CPC ......... G01S 11/026 (2013.01); H04W 64/003 (2013.01); *H04W 88/02* (2013.01); *H04W 88/08* (2013.01)

(58) Field of Classification Search
 USPC ............................... 455/456.1–3, 457, 404.2
 See application file for complete search history.

(56) References Cited

U.S. PATENT DOCUMENTS

| | | | |
|---|---|---|---|
| 2007/0002813 A1 | 1/2007 | Tenny et al. | |
| 2010/0208711 A1 | 8/2010 | Georgis et al. | |
| 2011/0117924 A1* | 5/2011 | Brunner | G01S 5/0252 455/456.1 |
| 2011/0199964 A1 | 8/2011 | Karaoguz et al. | |
| 2013/0109406 A1* | 5/2013 | Meador | H04L 67/125 455/456.1 |
| 2013/0267242 A1 | 10/2013 | Curticapean et al. | |
| 2013/0307723 A1 | 11/2013 | Garin et al. | |
| 2014/0036701 A1 | 2/2014 | Gao et al. | |
| 2014/0073363 A1* | 3/2014 | Tidd | G01S 5/0242 455/456.5 |
| 2014/0179340 A1* | 6/2014 | Do | G01S 5/021 455/456.1 |
| 2014/0187257 A1* | 7/2014 | Emadzadeh | G01S 5/0242 455/456.1 |
| 2017/0019876 A1* | 1/2017 | Steiner | H04W 64/003 |

OTHER PUBLICATIONS

"International Application Serial No. PCT/US2014/019842, Written Opinion dated Nov. 26, 2014", 9 pgs.

"Chinese Application Serial No. 201480074293.6, Office Action dated Jun. 1, 2017", (W/ English Translation), 17 pgs.

\* cited by examiner

ACCESS POINT POSITION DETERMINATION BY MOBILE DEVICES CROWD SOURCING

This application is a U.S. National State Application under 35 U.S.C. 371 from International Application No. PCT/US2014/019842, filed Mar. 3, 2014, which is hereby incorporated by reference in its entirety.

BACKGROUND

Outdoor navigation is widely deployed thanks to the development of various global-navigation satellite-systems (GNSS), e.g., Global Positioning System (GPS), Global Navigation Satellite System (GLONASS) and GALILEO of the European Union (EU) and European Space Agency (ESA). GNSS provide autonomous geo-spatial positioning with global coverage. Small electronic receivers determine their location (longitude, latitude, and altitude) with high precision (within a few meters) using time signals transmitted along a line of sight by radio from satellites.

Recently, there has been a lot of focus on indoor navigation. This field differs from the outdoor navigation since the indoor environment does not enable the reception of signals from GNSS satellites. Rather, a network of devices is used to wirelessly locate objects or people inside a building. The major consumer benefit of indoor positioning is the expansion of location-aware mobile computing indoors. Contextual awareness for applications running on wireless devices has become a priority for developers. Most applications currently rely on GPS, however, and function poorly indoors. Examples of applications benefiting from indoor location include augmented reality, shopping mall, grocery stores and airport maps, targeted advertising, social networking, etc. As a result a lot of effort is being directed towards solving the indoor navigation problem. This problem does not have a scalable solution yet with satisfactory precision.

One solution to this problem is based on the Time-of-Flight (ToF) or Tim-of-Arrival (ToA) method, which is based on the amount of time that a signal takes to propagate from transmitter to receiver. Because the signal propagation rate is constant and known (e.g., ignoring differences in mediums) the travel time of a signal can be used to directly calculate distance. Multiple measurements can be combined with trilateration to find a location. Systems which use ToF generally require a complicated synchronization mechanism to maintain a reliable source of time for sensors. Further, the accuracy of the TOA based methods often suffers from massive multipath conditions in indoor localization, which is caused by the reflection and diffraction of the radio frequency (RF) signal from objects (e.g., interior wall, doors or furniture) in the environment.

ToF methods are very robust and scalable but involve hardware changes to the modems, such as WiFi® modems. Nevertheless, due to the higher accuracy, some new issues arise with ToF location that was insignificant before. Knowing the exact position of the AP is one of these issues. Accurate positioning based on range measurement from access point relies on the knowledge of the position of the access point. The final position accuracy is dependent, among other things, in having the access point position as accurate as the range measurement or better.

The access point's position is available, either within some data base or reported by the access point itself. Bias in the reported access point position will reflect in bias in the determined position of the mobile device. Since the accuracy is quite high (e.g., a few tens of centimeters or less) this task is not simple, and might require dedicated measurement gear such as a total station (The total station is an electronic theodolite integrated with an electronic distance meter) or other. This equipment is typically used by construction surveyors. Targeting high accuracy positioning, for example for shelf accurate navigation, will rely on the accurate determination of the position of access points.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

According to an embodiment, the process of achieving position determination accuracy is provided without usage of special equipment by professionals. Currently access point positioning is performed using a map, e.g., pointing on a map where an access point is believed to be located. However, this results in insufficient accuracy for future features and use cases. Another method that can achieve some accuracy is by using surveying equipment which is expensive and professional skills are used to operate such surveying equipment.

According to an embodiment, several range measurements between each user and several access points are made. By using many users, in a crowd sourcing fashion, the position of the access point can be calculated with increasing accuracy as the number of users increases. Prior knowledge of user position may not be used, which contrasts to other existing methods such as reverse trilateration.

Figure 1:
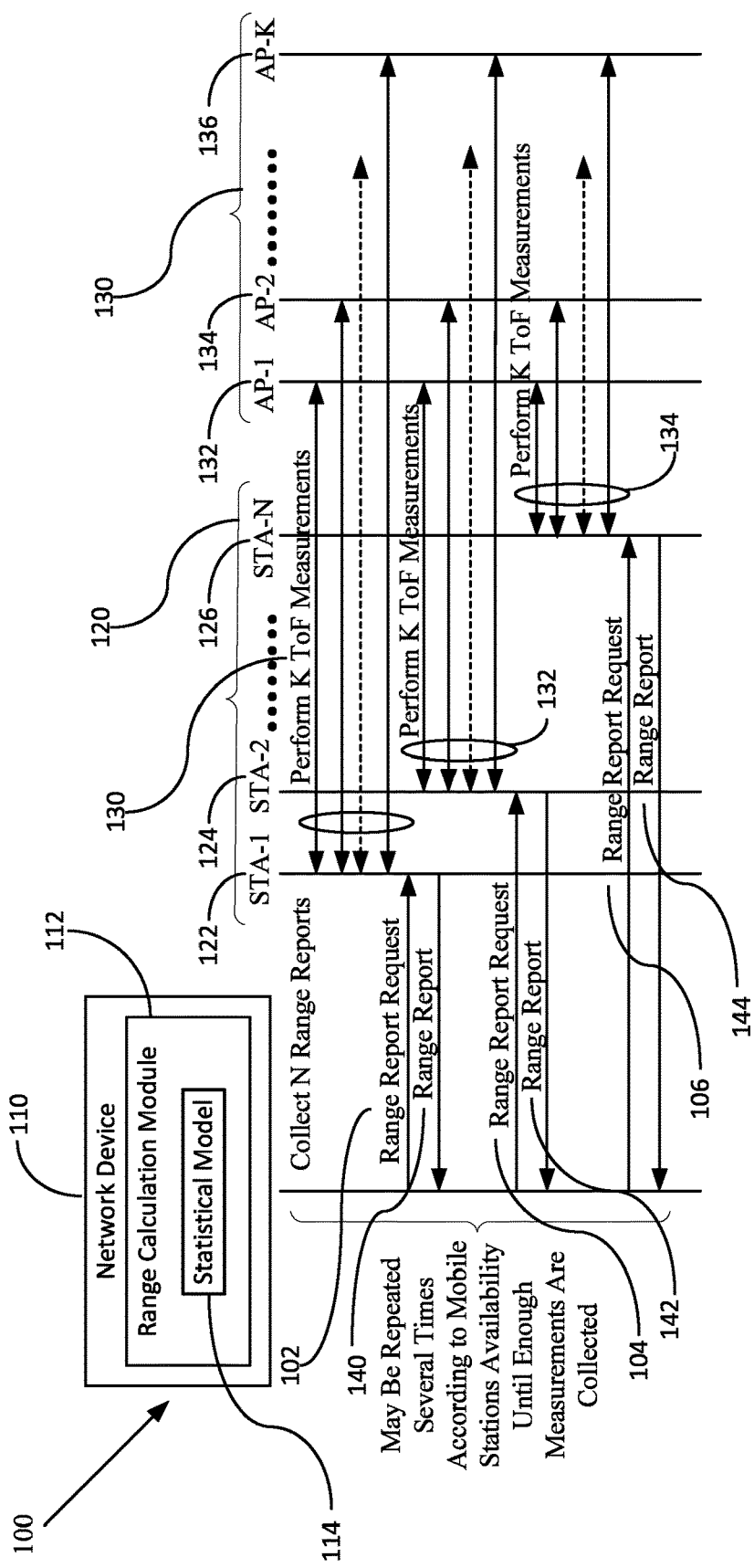
FIG. 1 illustrates an example of the procedure to collect range measurement according to an embodiment.

FIG. 1 illustrates an example of the procedure 100 to collect range measurement according to an embodiment. In FIG. 1, a network entity 110 is shown collecting range reports. A plurality of mobile devices 120, e.g., a first mobile station (STA-1) 122, STA-2 124, STA-N 126, and a plurality of access points 130, e.g., AP-1 132, AP-2 134 and AP-K 136, may be disposed in a venue or building. A network entity 110 may be the procedure manager entity, which may include the AP, backbone AP manager, system owner, etc. The network entity 110 may send a range report request 102, 104, 106 to the plurality of mobile devices 120. Each of the plurality of mobile devices 120 may perform ToF measurements to each of the plurality of access points 130. Each of the plurality of mobile devices 120 then send a range report 140, 142, 144 to the network entity 110. The network entity may include a range calculation module 112 for determining the position of each of the plurality of APs 130 using the range reports 140, 142, 144. Alternatively, the plurality of mobile devices 120 may include a range module (not shown in FIG. 1; see FIG. 5) to obtain range measurements. A range module 540 may also enable the plurality of mobile devices 120 to calculate range measurements to identify the position of APs in a network. Where there are several deployed APs 130 in a venue or building, many mobile device 120 may perform many range measurement as the mobile devices 120 pass through the area. Many range measurement sets may be obtained from the same mobile device, e.g., STA-1 122, from different locations/measurement points, or the combination of the two: many mobile devices 120 performing many range measurement sets from different measurement points. Accordingly, many range sets are collected, from many different measurement points from one mobile device, e.g., STA-1, or many mobile devices 120.

The goal is to determine the location of the APs 130. The APs 130 and the mobile devices 120 are located in some unknown position. Thus, at first glance, it seems that it is impossible to locate the mobile devices 120 and the APs 130 with range measurements. For example, a statistical model 114 may be applied to the obtain range measurement to obtain the position of each of the plurality of APs 130 and the plurality of mobile devices 120.

To accurately perform location determination, the unknowns are identified. As shown in FIG. 1, there may be K access point positions and 3*K unknowns for the three dimensional case and 2*K for the two dimensional case. N measurement points are provided, which correspond to the location of the mobile devices 120 relative to each of the APs 130 when a range measurement set was taken. This results in 3*N unknowns for the three dimensional case.

A range measurement set is a group of range measurement taken from the same position, either taken in a very short time, or the mobile device was stationary (or almost stationary). If the number of the unknowns is smaller than the number of measurement, the unknowns may be determined. The unknown of interest here is the AP position, which is related to the measurements. However, accuracy may be increased by increasing the number of measurement points.

If there are K range measurements at each measurement point, in total there are N*K measurements, and if N>K and K>3, for the three dimensional case, the condition where 3*K+3*N<N*K is easily met. In the two dimensional case, K=3 is possible as well.

Figure 2:
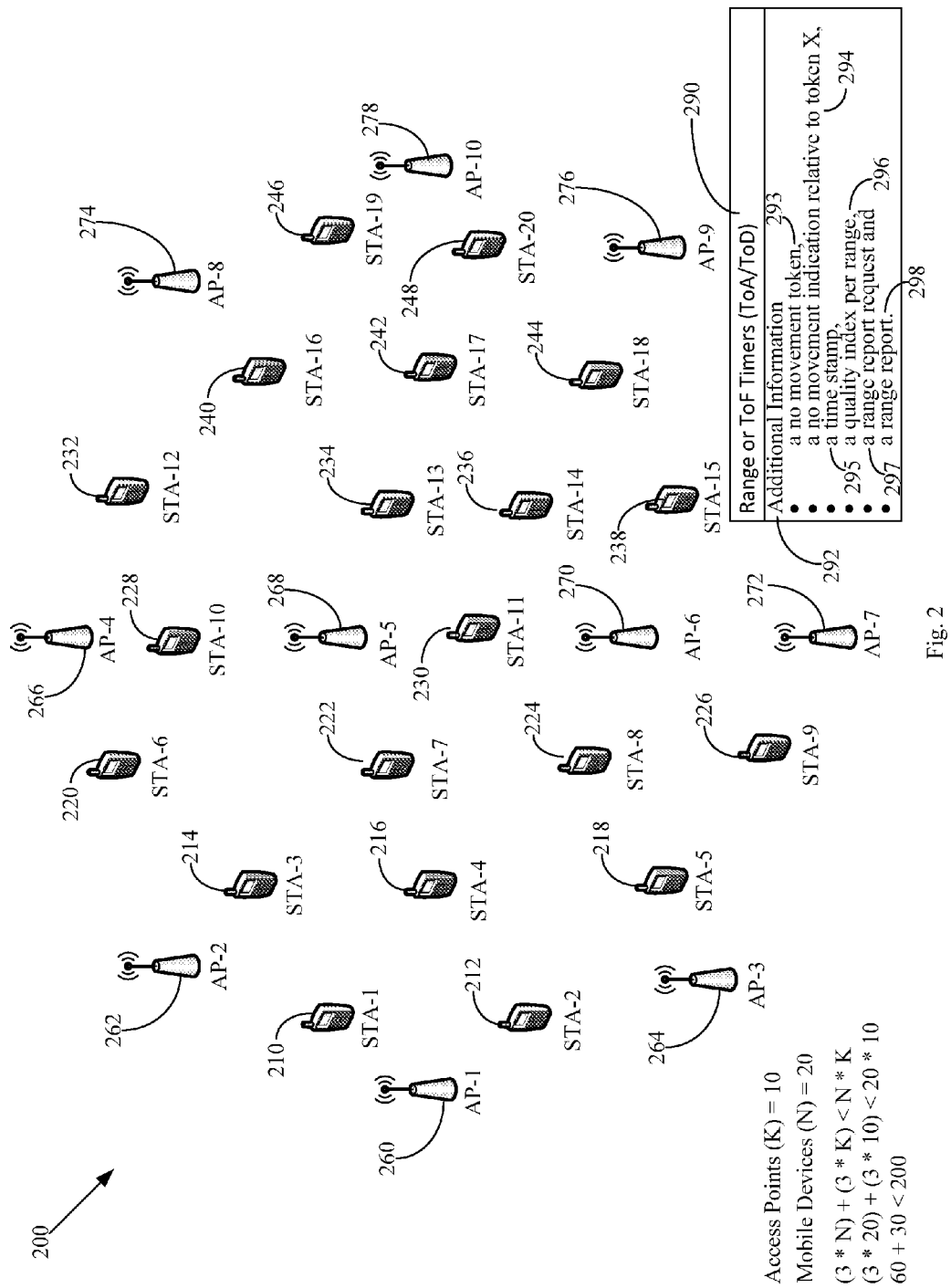
FIG. 2 illustrates an example of a wireless network according to an embodiment.

FIG. 2 illustrates an example of a network 200 according to an embodiment. For example, in FIG. 2, there are 20 mobile devices 210-248 and 10 APs 260-278. Accordingly, there are 30 unknowns for the three dimensional case. Each mobile device may make 10 range measurements, i.e., one to each of the 10 APs. Thus, in total, 200 range measurements may be made. In the example shown in FIG. 2, N is equal to 20 (e.g., the number of mobile devices 210-248) and K is equal to 10 (e.g., the number of APs 260-278) so there are in total 200 range measurements made (N*K=20*10=200). N is greater than K and K is greater than 3, i.e., 20>10 and 10>3. Thus, the condition 3*K+3*N<N*K is met, i.e., 3*(20)+3*(10)<(20*(10).

The range measurements may be divided into groups, wherein each group may include several range measurements from several APs, which are taken in the same position. To create these groups, either the mobile device informs the AP that the mobile device did not change positions, or the mobile device reports a time stamp and some heuristics that may be used, e.g., during the last 1 second, the mobile device did not move substantially from its previous position.

The mobile devices 210-248 may perform range calculations or the mobile devices 210-248 may report Time-of-Arrival (ToA) and Time-of-Departure (ToD) or the difference, ToD-ToA, wherein the range will be calculated at the other end, e.g., by the AP or other network device. The mobile devices 210-248 may provide in a report the range or Time-of-Flight (ToF) timers information 290, e.g., ToA and ToD, along with a report with additional information 292. The mobile device may provide a no movement token 293, a no movement indication relative to token X 294, a time stamp 295, a quality index per range 296, a range report request 297 and a range report 298. The no movement token 293 is a token that is incremented when the location of the mobile device changes. If this feature is not supported, then an indicator is incremented for a measurement. The mobile device may provide information regarding no movement indication relative to token X 294 to indicate that the current measurement is from the same position as a previous measurement with token X. A time stamp 295 may be provided, wherein the time of day in sub-seconds resolution, milliseconds, etc. may be indicated. A quality index per range 296 is the estimated STD of range measurements. The mobile device may provide an estimate of the mobile device's position, if available, and its accuracy. A range report request 297 is a network request sent to the mobile device requesting the mobile device to send a list of measured ranges. A range report 298 is a report made by the mobile device upon request of a list of measured range.

Figure 3:
FIG. 3 is a diagram showing convergence of range measurements according to an embodiment.

FIG. 3 is a diagram 300 showing convergence of range measurements according to an embodiment. An estimation of the position of an access point (AP) may be accomplished according to several methods. For example, the estimation of the position of an AP may be accomplished by applying an iterative Least Square (LS) or weighted LS process to range measurements. Also, a two-step estimation may be used to reduce the computational cost. Using such processes, a location for an AP and the position of users may be estimated. This process continues until the range measurements converge.

The diagram 300 of FIG. 3 illustrates a simulation of AP position determination by mobile devices crowd sourcing according to an embodiment. FIG. 3 shows 10 APs 310-328 with 50 measurement sets (dashed lines), which may be based on a 2 meter (m) standard deviation (STD) range error. FIG. 3 shows that the trails (open circles) representing the positions of the 10 APs converge to the correct position of each AP. In this case, the maximum AP position error may be 0.67 m, and the average error may be 0.37 m. The grid shown in FIG. 3 represents a 20 m×20 m area.

A method according to an embodiment may be used for deployment and/or maintenance. For deployment, the position of the APs 310-328 are found, or the position accuracy is refined when the system is online and working. A dedicated procedure for AP position determination may also be performed, e.g., by an IT team. For maintenance, the method may be used when adding or moving one or more of the APs 310-328 to determine its new position.

Database accuracy may also be improved through the use of more measurements. Also, the method may be used for maintenance to run statistical analysis and failure detection.

The position output of the algorithm is relative. Specifically, there may be an arbitrary position offset and arbitrary rotation of the map. These may be removed by one or more methods such as using some additional inputs regarding the position of a few users, e.g., GPS fixes of a user that enters the venue or building. Another option is that one or two of the AP locations are known in advance. Thus, according to an embodiment the deployment is simplified and allows earlier and wider availability of ToF based indoor positioning.

Figure 4:
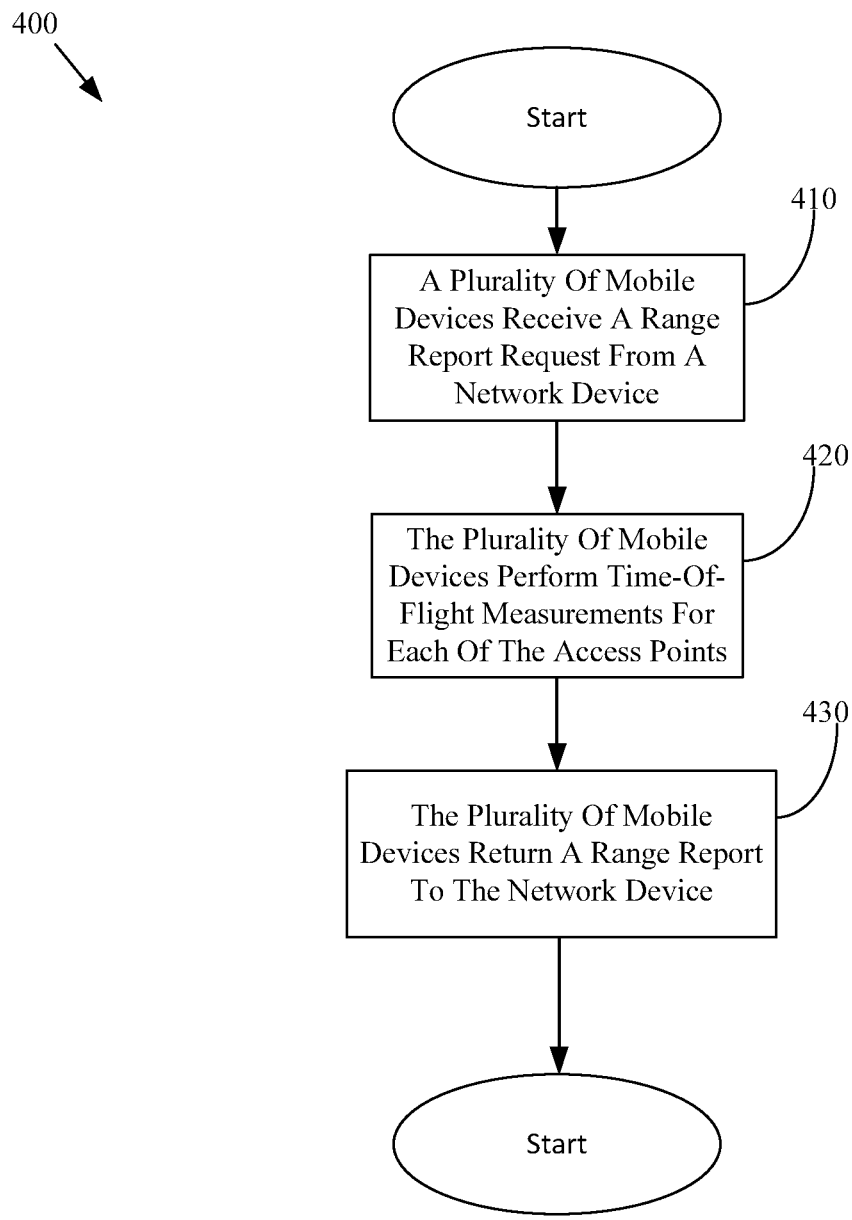
FIG. 4 is a flow chart of a method for providing access point position determination by mobile devices crowd sourcing according to an embodiment.

FIG. 4 is a flow chart 400 of a method for providing access point position determination by mobile devices crowd sourcing according to an embodiment. A plurality of mobile devices receives a range report request from a network device 410. The plurality of mobile devices performs time-of-flight measurements for each of the access points 420. The plurality of mobile devices returns a range report to the network device 430.

The range report may include range measurements for the network device to use to determine the position of each of the access points. However, the plurality of mobile devices may also be arranged to calculate the position of each of the access points and provide the calculated positions in the range report sent to the network device. In addition to the range or ToF timers (ToA/ToD) information, the plurality of mobile devices may also include additional information in the range report. For example, the plurality of mobile devices may provide a no movement token, a no movement indication relative to token X, a time stamp, a quality index per range, a range report request and a range report.

Figure 5:
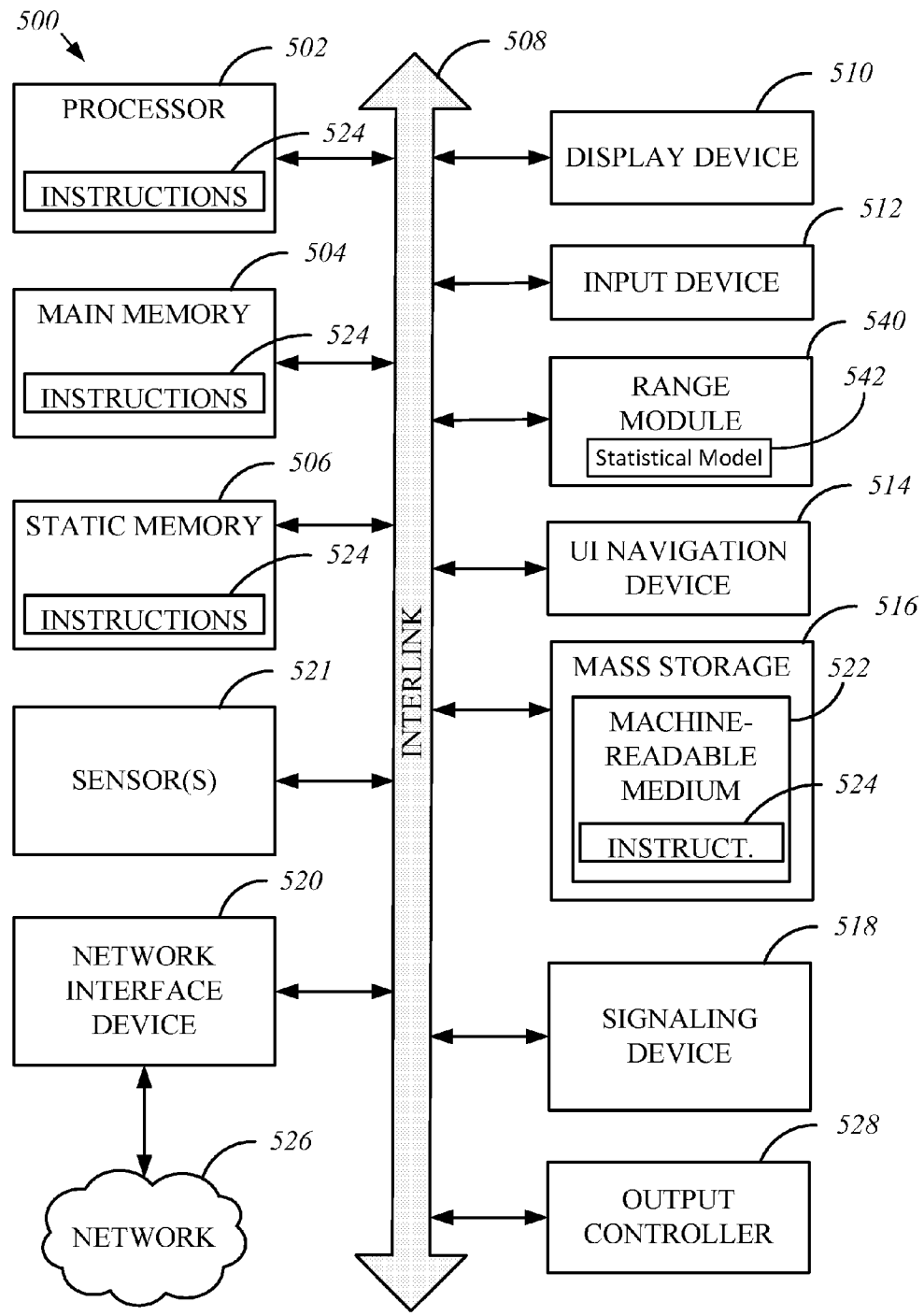
FIG. 5 illustrates a block diagram of an example machine for providing access point position determination by mobile devices crowd sourcing according to an embodiment.

FIG. 5 illustrates a block diagram of an example machine 500 for providing access point position determination by mobile devices crowd sourcing according to an embodiment upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine and/or a client machine in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 502 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 502 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 500 may include a hardware processor 502 (e.g., a central processing unit (CPU), a graphics processing unit (GPU), a hardware processor core, or any combination thereof), a main memory 504 and a static memory 506, at least some of which may communicate with others via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signaling device 518 (e.g., a transceiver, a speaker, etc.), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include at least one machine readable medium 522 on which is stored one or more sets of data structures or instructions 524 (e.g., software) embodying or utilized by any one or more of the techniques or functions described herein. The instructions 524 may also reside, at least partially, additional machine readable memories such as main memory 504, static memory 506, or within the hardware processor 502 during execution thereof by the machine 500. In an example, one or any combination of the hardware processor 502, the main memory 504, the static memory 506, or the storage device 516 may constitute machine readable media. The machine may also include a range module 540 that allows the machine 500 to obtain ranging measurements. For example, a statistical model 542 may be applied to the obtain range measurement to calculate the position of each of the plurality of APs. The range module 540 may also enable the machine 500 to calculate range measurements to identify the position of APs in a network. The range module 540 may operate with the processor 502 to obtain range measurements and to calculate range measurements to identify the position of APs in a network.

While the machine readable medium 522 is illustrated as a single medium, the term "machine readable medium" may include a single medium or multiple media (e.g., a centralized or distributed database, and/or associated caches and servers) that configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk read-only memory (CD-ROM) and digital video disk read-only memory (DVD-ROM) disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x*standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi®), IEEE 802.16 standards (Wi-Max®) and others), peer-to-peer (P2P) networks, or other protocols now known or later developed.

For example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & in Examples

Example 1 includes subject matter (such as a device, apparatus, client or system) for a network entity, including a signaling device for receiving and transmitting signals; and a processor, coupled to the signaling device, for processing signals for transmission by the signaling device and for processing signals received by the signaling device; wherein the signaling device is arranged to send a range report request to at least one mobile device for determining a position of a plurality of access points (APs) and is arranged to receive, at the signaling device, a range report associated with range measurements performed by the at least one mobile device on each of the plurality of APs to a network entity.

In Example 2 the subject matter of Example 1 may optionally include, wherein the range report includes range calculations performed by the at least one mobile device at a plurality of locations identifying a position for each of the plurality of APs.

In Example 3 the subject matter of any one or more of Examples 1-2 may optionally include, wherein the range report includes the range measurements associated with each of the plurality of APs, performed by the at least one mobile device, for processing by the processor to determine a position for each of the plurality of APs by the network entity.

In Example 4 the subject matter of any one or more of Examples 1-3 may optionally include, a range model for performing, under control of the processor, statistical analysis on the range measurements received by the signaling device.

In Example 5 the subject matter of any one or more of Examples 1-4 may optionally include, wherein the range model performs, under control of the processor, statistical analysis on the range measurements by applying a statistical model to the range measurements performed on each of the plurality of APs to determine the position of each of the plurality of APs.

In Example 6 the subject matter of any one or more of Examples 1-5 may optionally include, wherein the statistical model identifies a convergence of range measurements to estimate the position of the plurality of APs by applying the statistical model to the range measurements.

In Example 7 the subject matter of any one or more of Examples 1-6 may optionally include, wherein the range report includes Time-of-Flight measurements performed on each of the plurality of APs.

In Example 8 the subject matter of any one or more of Examples 1-7 may optionally include, wherein the range report includes K range measurements made by N measurement points corresponding to the at least one mobile device to provide N*K measurements on the APs, wherein N>K and K>3 such that 3*K+3*N<N*K.

In Example 9 the subject matter of any one or more of Examples 1-8 may optionally include, wherein the range report includes a plurality of range measurements divided into groups, wherein the range measurement include range measurements from several APs taken by a plurality of mobile devices while in a same position.

In Example 10 the subject matter of any one or more of Examples 1-9 may optionally include, wherein the signaling device receives a time stamp and heuristics to determine whether each of the plurality of mobile devices changed position when performing the range measurements.

In Example 1lthe subject matter of any one or more of Examples 1-10 may optionally include, wherein the range report associated with the range measurements performed on each of the plurality of APs comprises Time-of-Flight timer information including additional information, wherein the additional information includes at least one type of information selected from a group consisting of:

a no movement token;
a no movement indication relative to token X;
a time stamp;
a quality index per range;
a range report request; and
a range report.

Example 12 may include subject matter (such as a method or means for performing acts) including receiving, at least one mobile device, a range report request from a network entity for determining a position of a plurality of access points (APs);
   performing, by the at least one mobile device, range measurements on each of the plurality of APs; and
   sending, to the network entity, a range report associated with the range measurements performed on each of the plurality of APs.

In Example 13 the subject matter of Example 12 may optionally include, wherein the sending, to the network entity, a range report associated with the range measurements performed on each of the plurality of APs comprises sending a range report that includes range calculations performed by the at least one mobile device identifying a position for each of the plurality of APs.

In Example 14 the subject matter of any one or more of Examples 12-13 may optionally include, wherein the sending, to the network entity, a range report associated with the range measurements performed on each of the plurality of APs comprises sending a range report that includes the range measurements associated with each of the plurality of APs for use by the network entity to determine a position for each of the plurality of APs by the network entity.

In Example 15 the subject matter of any one or more of Examples 12-14 may optionally include, applying a statistical model to the range measurements performed on each of the plurality of APs to determine the position of each of the plurality of APs.

In Example 16 the subject matter of any one or more of Examples 12-15 may optionally include, wherein the applying the statistical model to the range measurements performed on each of the plurality of APs comprises identifying a convergence of range measurements to estimate the position of the plurality of APs by applying the statistical model to the range measurements.

In Example 17 the subject matter of any one or more of Examples 12-16 may optionally include, wherein the performing, by the at least one mobile device, range measurements on each of the plurality of APs further comprises performing Time-of-Flight measurements on each of the plurality of APs.

In Example 18 the subject matter of any one or more of Examples 12-17 may optionally include, wherein the performing, by the at least one mobile device, range measurements on each of the plurality of APs further comprises providing N measurement points corresponding to a location of the at least one mobile device relative to each of the APs and performing K range measurements at each measurement point to provide N*K measurements on the APs, wherein N>K and K>3 such that 3*K+3*N<N*K.

In Example 19 the subject matter of any one or more of Examples 12-18 may optionally include, wherein the performing, by the at least one mobile device, range measurements on each of the plurality of APs further comprises dividing the range measurements into groups, wherein each group may include a plurality of range measurements from several APs taken by a plurality of mobile devices while in a same position.

In Example 20 the subject matter of any one or more of Examples 12-19 may optionally include, wherein the performing the range measurements comprises dividing the range measurements into groups, wherein each group may include a plurality of range measurements from several APs taken by a plurality of mobile devices while in the same position, the plurality of mobile devices informing the network entity that the plurality of mobile device did not change position.

In Example 21 the subject matter of any one or more of Examples 12-20 may optionally include, wherein the dividing the range measurements into groups, wherein each group may include a plurality of range measurements from several APs taken by a plurality of mobile devices while in the same position further comprises reporting, by the plurality of mobile devices a time stamp and heuristics used by the network entity to determine whether each of the plurality of mobile devices changed position when performing the range measurements.

In Example 22 the subject matter of any one or more of Examples 12-21 may optionally include, wherein the sending, to the network entity, a range report associated with the range measurements performed on each of the plurality of APs comprises sending a range report comprising Time-of-Flight timer information including additional information, wherein the additional information includes at least one type of information selected from a group consisting of:
   a no movement token;
   a no movement indication relative to token X;
   a time stamp;
   a quality index per range;
   a range report request; and
   a range report.

Example 23 may include subject matter (such as means for performing acts or machine readable medium including instructions that, when executed by the machine, cause the machine to perform acts) including receiving, at least one mobile device, a range report request from a network entity for determining a position of a plurality of access points (APs);
   performing, by the at least one mobile device, range measurements on each of the plurality of APs; and
   sending, to the network entity, a range report associated with the range measurements performed on each of the plurality of APs.

In Example 24 the subject matter of Example 23 may optionally include, wherein the sending, to the network entity, a range report associated with the range measurements performed on each of the plurality of APs comprises sending a range report that includes range calculations performed by the at least one mobile device identifying a position for each of the plurality of APs.

In Example 25 the subject matter of any one or more of Examples 23-24 may optionally include, wherein the sending, to the network entity, a range report associated with the range measurements performed on each of the plurality of APs comprises sending a range report that includes the range measurements associated with each of the plurality of APs for use by the network entity to determine a position for each of the plurality of APs by the network entity.

In Example 26 the subject matter of any one or more of Examples 23-25 may optionally include, applying a statistical model to the range measurements performed on each of the plurality of APs to determine the position of each of the plurality of APs.

In Example 27 the subject matter of any one or more of Examples 23-26 may optionally include, wherein the applying the statistical model to the range measurements performed on each of the plurality of APs comprises identifying a convergence of range measurements to estimate the position of the plurality of APs by applying the statistical model to the range measurements.

In Example 28 the subject matter of any one or more of Examples 23-27 may optionally include, wherein the performing, by the at least one mobile device, range measurements on each of the plurality of APs further comprises performing Time-of-Flight measurements on each of the plurality of APs.

In Example 29 the subject matter of any one or more of Examples 23-28 may optionally include, wherein the performing, by the at least one mobile device, range measurements on each of the plurality of APs further comprises providing N measurement points corresponding to a location of the at least one mobile device relative to each of the APs and performing K range measurements at each measurement point to provide N*K measurements on the APs, wherein N>K and K>3 such that 3*K+3*N<N*K.

In Example 30 the subject matter of any one or more of Examples 23-29 may optionally include, wherein the performing, by the at least one mobile device, range measurements on each of the plurality of APs further comprises dividing the range measurements into groups, wherein each group may include a plurality of range measurements from several APs taken by a plurality of mobile devices while in a same position.

In Example 31 the subject matter of any one or more of Examples 23-30 may optionally include, wherein the performing the range measurements comprises dividing the range measurements into groups, wherein each group may include a plurality of range measurements from several APs taken by a plurality of mobile devices while in the same position, the plurality of mobile devices informing the network entity that the plurality of mobile device did not change position.

In Example 32 the subject matter of any one or more of Examples 23-31 may optionally include, wherein the dividing the range measurements into groups, wherein each group may include a plurality of range measurements from several APs taken by a plurality of mobile devices while in the same position further comprises reporting, by the plurality of mobile devices a time stamp and heuristics used by the network entity to determine whether each of the plurality of mobile devices changed position when performing the range measurements.

In Example 33 the subject matter of any one or more of Examples 23-32 may optionally include, wherein the sending, to the network entity, a range report associated with the range measurements performed on each of the plurality of APs comprises sending a range report comprising Time-of-Flight timer information including additional information, wherein the additional information includes at least one type of information selected from a group consisting of:
 a no movement token;
 a no movement indication relative to token X;
 a time stamp;
 a quality index per range;
 a range report request; and
 a range report.

Example 34 includes subject matter (such as a device, apparatus, client, mobile device or system), including a signaling device for receiving and transmitting signals and a processor, coupled to the signaling device, for processing signals for transmission by the signaling device and for processing signals received by the signaling device, wherein the signaling device is arranged to receive from a network entity a range report request for determining a position of a plurality of access points (APs), to perform range measurements on each of the plurality of APs and to send, to the network entity, a range report associated with range measurements performed on each of the plurality of APs.

In Example 35 the subject matter of Example 34 may optionally include, wherein the range report includes range calculations performed at a plurality of locations identifying a position for each of the plurality of APs.

In Example 36 the subject matter of any one or more of Examples 34-35 may optionally include, wherein the range report includes the range measurements associated with each of the plurality of APs for use by the network entity to determine a position for each of the plurality of APs by the network entity.

In Example 37 the subject matter of any one or more of Examples 34-36 may optionally include, wherein the range report includes Time-of-Flight measurements performed on each of the plurality of APs.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network entity for determining positions of access points (APs), comprising:
   a signaling device for receiving and transmitting signals; and
   a processor, coupled to the signaling device, for processing signals for transmission by the signaling device and for processing signals received by the signaling device,
   wherein the signaling device is arranged to send a range report request to a plurality of mobile devices at a plurality of locations for determining a position of each of a plurality of APs, the signaling device arranged to receive a range report associated with range measurements performed by the plurality of mobile devices on each of the plurality of APs,
   wherein position of each of the plurality of mobile devices and the position of each of the plurality of APs are unknown,
   wherein the range report includes range calculations performed by the plurality of mobile devices at a plurality of locations identifying a position for each of the plurality of APs, and
   wherein the range report includes K range measurements made at N measurement points, N corresponding to the number of the plurality of mobile devices, to provide N*K measurements on the APs, wherein N>K and K>3 such that 3*K+3*N<N*K.

2. The network entity of claim 1, wherein the range report includes the range measurements associated with each of the plurality of APs, performed by the at least one mobile device, for processing by the processor to determine a position for each of the plurality of APs by the network entity.

3. The network entity of claim 1 further comprising a range model for performing, under control of the processor, statistical analysis on the range measurements received by the signaling device.

4. The network entity of claim 3, wherein the range model performs, under control of the processor, statistical analysis on the range measurements by applying a statistical model to the range measurements performed on each of the plurality of APs to determine the position of each of the plurality of APs.

5. The network entity of claim 4, wherein the statistical model identifies a convergence of range measurements to estimate the position of the plurality of APs by applying the statistical model to the range measurements.

6. The network entity of claim 1, wherein the range report includes Time-of-Flight measurements performed on each of the plurality of APs.

7. The network entity of claim 1, wherein the range report includes a plurality of range measurements divided into groups, wherein the range measurements include range measurements from several APs taken by a plurality of mobile devices while in a same position.

8. The network entity of claim 7, wherein the signaling device receives a time stamp and heuristics to determine whether each of the plurality of mobile devices changed position when performing the range measurements.

9. The network entity of claim 1, wherein the range report associated with the range measurements performed on each of the plurality of APs comprises Time-of-Flight timer information including additional information, wherein the additional information includes at least one type of information selected from a group consisting of:
   a no movement token;
   a no movement indication relative to token X;
   a time stamp;
   a quality index per range;
   a range report request; and
   a range report.

10. A method for performing access point (AP) position determination, comprising:
   receiving, at a plurality of mobile devices at a plurality of locations, a range report request from a network entity for determining a position of a plurality of APs;
   performing, by the plurality of mobile devices, range measurements on each of the plurality of APs; and
   sending, to the network entity, a range report associated with the range measurements performed on each of the plurality of APs,
   wherein position of each of the plurality of mobile devices and position of each of the plurality of APs are unknown,
   wherein the sending, to the network entity, a range report associated with the range measurements performed on each of the plurality of APs comprises sending a range report that includes range calculations performed by the plurality of mobile devices identifying a position for each of the plurality of APs, and
   wherein the performing, by the plurality of mobile devices, range measurements on each of the plurality of APs further comprises providing at N measurement points, each corresponding to a location of one of the plurality of mobile devices relative to each of the APs, and performing K range measurements at each measurement point to provide N*K measurements on the APs, wherein N>K and K>3 such that 3*K+3*N<N*K.

11. The method of claim 10, wherein the sending, to the network entity, a range report associated with the range measurements performed on each of the plurality of APs comprises sending a range report that includes the range measurements associated with each of the plurality of APs for use by the network entity to determine a position for each of the plurality of APs by the network entity.

12. The method of claim 10 further comprising applying a statistical model to the range measurements performed on each of the plurality of APs to determine the position of each of the plurality of APs.

13. The method of claim 12, wherein the applying the statistical model to the range measurements performed on each of the plurality of APs comprises identifying a convergence of range measurements to estimate the position of the plurality of APs by applying the statistical model to the range measurements.

14. The method of claim 10, wherein the performing, by the at least one mobile device, range measurements on each of the plurality of APs further comprises performing Time-of-Flight measurements on each of the plurality of APs.

15. The method of claim 10, wherein the performing, by the at least one mobile device, range measurements on each of the plurality of APs further comprises dividing the range measurements into groups, wherein each group may include a plurality of range measurements from several APs taken by a plurality of mobile devices while in a same position.

16. The method of claim 15, wherein the performing range measurements comprises dividing the range measurements into groups, wherein each group may include a plurality of range measurements from several APs taken by a plurality of mobile devices while in the same position, the plurality of mobile devices informing the network entity that the plurality of mobile device did not change position.

17. The method of claim 15, wherein the dividing the range measurements into groups, wherein each group may include a plurality of range measurements from several APs taken by a plurality of mobile devices while in the same position further comprises reporting, by the plurality of mobile devices a time stamp and heuristics used by the network entity to determine whether each of the plurality of mobile devices changed position when performing the range measurements.

18. The method of claim 10, wherein the sending, to the network entity, a range report associated with the range measurements performed on each of the plurality of APs comprises sending a range report comprising Time-of-Flight timer information including additional information, wherein the additional information includes at least one type of information selected from a group consisting of:
 a no movement token;
 a no movement indication relative to token X;
 a time stamp;
 a quality index per range;
 a range report request; and
 a range report.

19. At least one non-transitory machine readable medium comprising instructions that, when executed by the machine, cause the machine to perform operations for performing access point position determination using crowd sourcing, the operations comprising:
 receiving, at a plurality of mobile devices at a plurality of locations, a range report request from a network entity for determining a position of a plurality of access points (APs);
 performing, by the plurality of mobile devices, range measurements on each of the plurality of APs; and
 sending, to the network entity, a range report associated with the range measurements performed on each of the plurality of APs,
  wherein position of each of the plurality of mobile devices and position of each of the plurality of APs are unknown,
  wherein the sending, to the network entity, a range report associated with the range measurements performed on each of the plurality of APs, comprises sending a range report that includes range calculations performed by the plurality of mobile devices identifying a position for each of the plurality of APs, and
  wherein the performing, by the plurality of mobile devices, range measurements on each of the plurality of APs, further comprises providing at N measurement points, each corresponding to a location of one of the plurality of mobile devices relative to each of the APs, and performing K range measurements at each measurement point to provide $N*K$ measurements on the APs wherein $N>K$ and $K>3$ such that $3*K+3*N<N*K$.

20. The at least one non-transitory machine readable medium of claim 19, wherein the sending, to the network entity, a range report associated with the range measurements performed on each of the plurality of APs comprises sending a range report that includes range calculations performed by the at least one mobile device identifying a position for each of the plurality of APs or sending a range report that includes the range measurements associated with each of the plurality of APs for use by the network entity to determine a position for each of the plurality of APs by the network entity.

21. The at least one non-transitory machine readable medium of claim 19 further comprising applying a statistical model to the range measurements performed on each of the plurality of APs to determine the position of each of the plurality of APs.

22. The at least one non-transitory machine readable medium of claim 21, wherein the applying the statistical model to the range measurements performed on each of the plurality of APs comprises identifying a convergence of range measurements to estimate the position of the plurality of APs by applying the statistical model to the range measurements.

23. A mobile device; comprising:
 a signaling device for receiving and transmitting signals; and
 a processor, coupled to the signaling device, for processing signals for transmission by the signaling device and for processing signals received by the signaling device,
  wherein the signaling device is arranged to send a range report request to a plurality of other mobile devices at a plurality of locations for determining a position of each of a plurality of access points (APs), the signaling device arranged to receive a range report associated with range measurements performed by the plurality of mobile devices on each of the plurality of APs,
  wherein position of each of the plurality of mobile devices and position of each of the plurality of APs are unknown,
  wherein the range report includes range calculations performed by the plurality of mobile devices at a plurality of locations identifying a position for each of the plurality of APs, and
  wherein the range report includes K range measurements made at N measurement points, N corresponding to the number of the plurality of mobile devices, to provide $N*K$ measurements on the APs, wherein $N>K$ and $K>3$ such that $3*K+3*N<N*K$.

24. The network entity of claim 23, wherein the range report includes the range measurements associated with each of the plurality of APs for use by the network entity to determine a position for each of the plurality of APs by the network entity.

25. The network entity of claim 23, wherein the range report includes Time-of-Flight measurements performed on each of the plurality of APs.

* * * * *